United States Patent [19]

van de Nieuwelaar et al.

[11] Patent Number: 4,779,308
[45] Date of Patent: Oct. 25, 1988

[54] METHOD AND DEVICE FOR SUPPORTING A CARCASS OR CARCASS PORTION

[75] Inventors: Josephus A. van de Nieuwelaar, Gemert; Janssen, Petrus C. H., Wilbertoord, both of Netherlands

[73] Assignee: Stork PMT B.V., Netherlands

[21] Appl. No.: 933,888

[22] Filed: Nov. 24, 1986

[30] Foreign Application Priority Data

Nov. 27, 1985 [NL] Netherlands .............. 8503287

[51] Int. Cl.⁴ .............................................. A22C 21/00
[52] U.S. Cl. .............................................. 17/45; 17/11
[58] Field of Search ............... 17/11, 44.1, 44, 70, 17/1 G

[56] References Cited

U.S. PATENT DOCUMENTS

| Re. 21,983 | 12/1941 | Brodeur | 17/11 |
|---|---|---|---|
| 2,015,262 | 9/1935 | Flagg et al. | 17/70 |
| 2,891,275 | 6/1959 | Schuls | 17/70 |
| 3,531,825 | 10/1970 | Segor et al. | 17/11 |
| 3,570,050 | 3/1971 | Draper et al. | 17/1 G X |
| 3,946,461 | 3/1976 | Martin | 17/11 |
| 4,385,419 | 5/1983 | Cantrell | 17/1 G X |
| 4,413,375 | 11/1983 | Cliff, Jr. | 17/24 X |
| 4,536,919 | 8/1985 | Cashwell et al. | 17/11 |
| 4,656,692 | 4/1987 | Villemin et al. | 17/44.1 |

FOREIGN PATENT DOCUMENTS 15315  5/1934  Australia ............................ 17/11

Primary Examiner—Willie G. Abercrombie
Attorney, Agent, or Firm—Hurt, Richardson, Garner, Todd & Cadenhead

[57] ABSTRACT

A method and device for supporting a carcass or carcass portion of slaughtered poultry for the purpose of performing processing operations thereon, said carcass or carcass portion being clamped in position by means of support members forming an acute angle, in such a manner that, with a view to performing such operations, the carcass and portions thereof are externally freely accessible, said support members acting on carcass portions located in the vicinity of the neck opening.

10 Claims, 8 Drawing Sheets

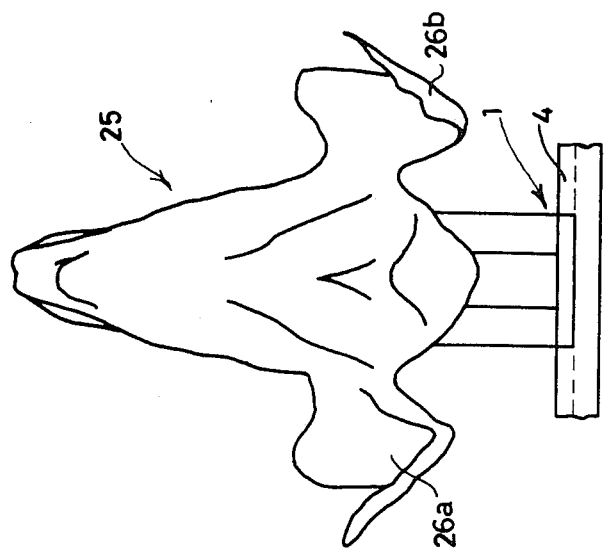
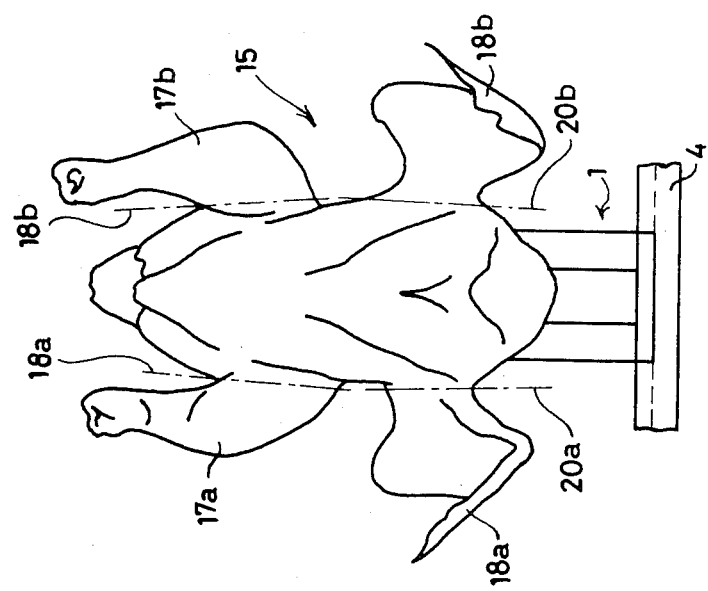

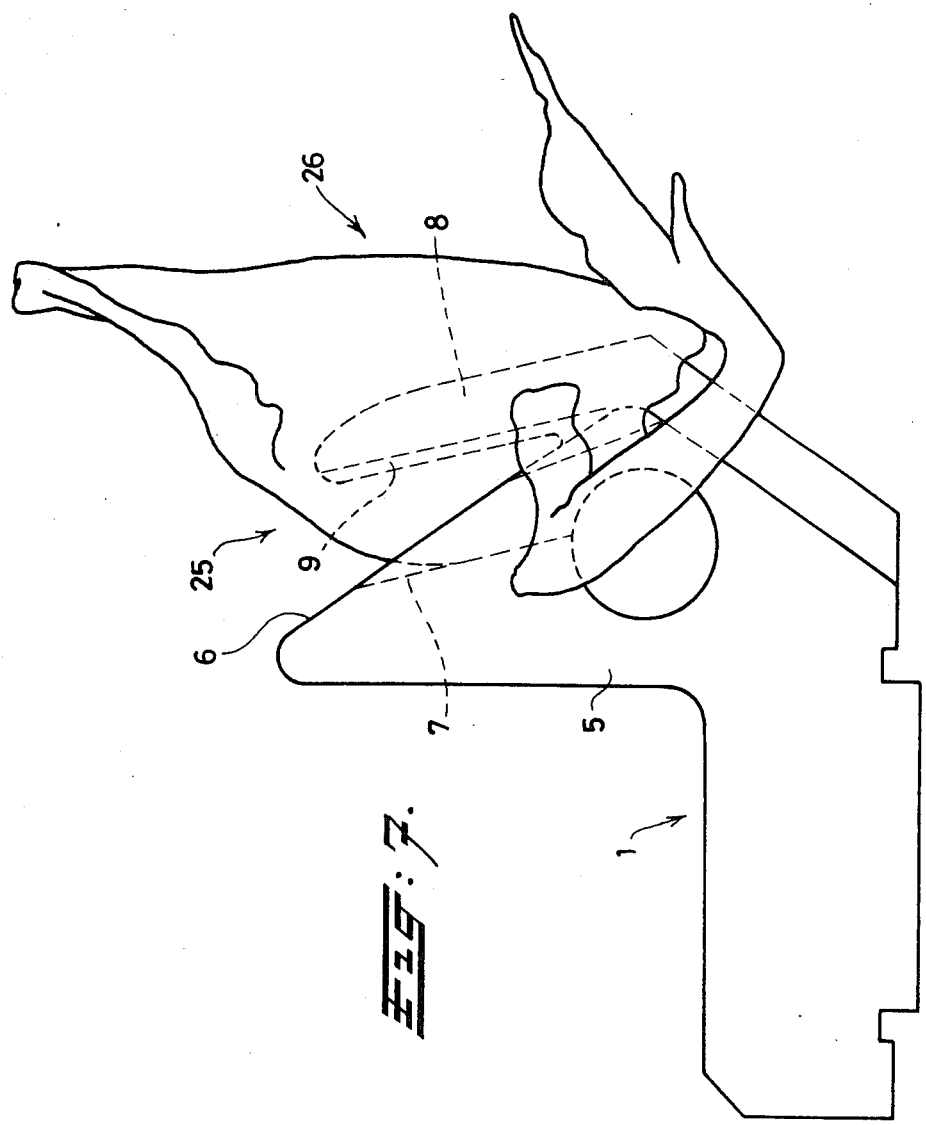

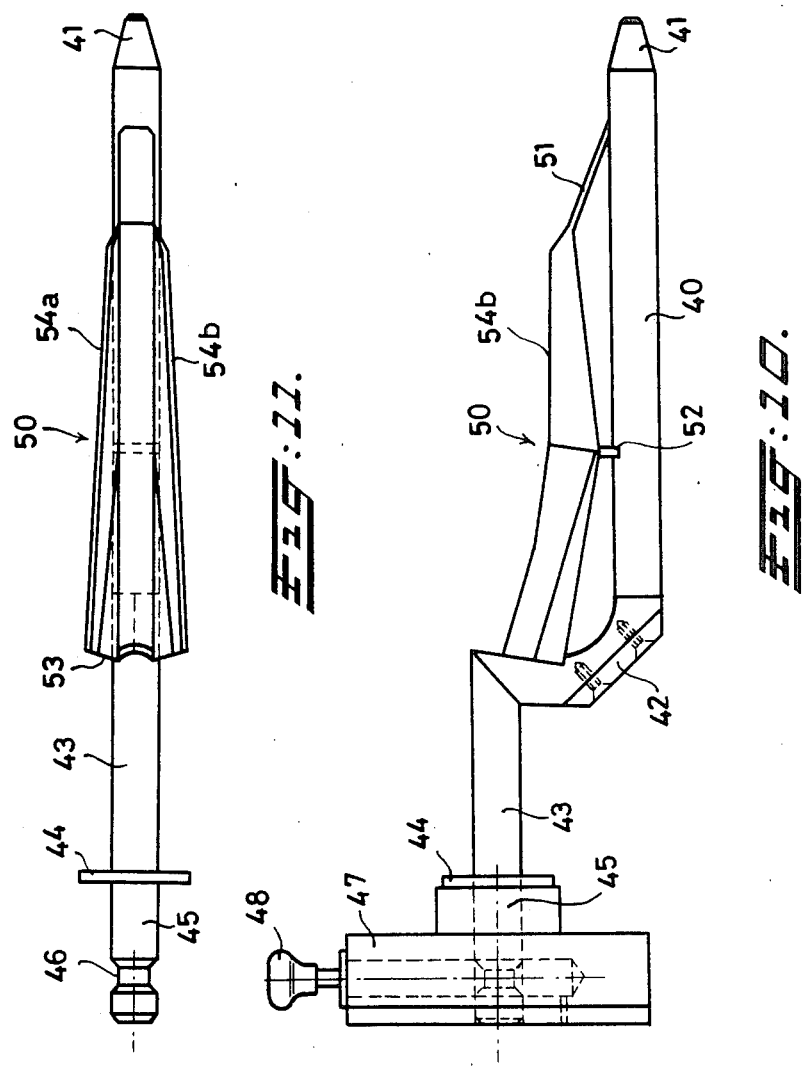

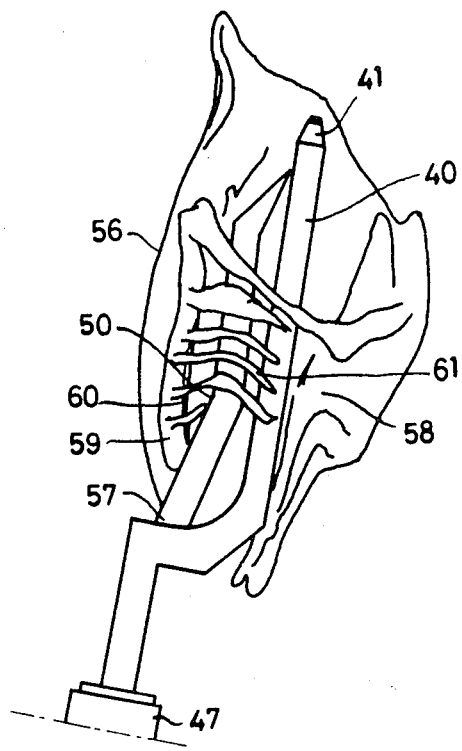
FIG:12.

METHOD AND DEVICE FOR SUPPORTING A CARCASS OR CARCASS PORTION

BACKGROUND OF THE INVENTION

The invention relates to a method for supporting a carcass or carcass portion of slaughtered poultry for the purpose of performing processing operations thereon, said carcass or carcass portion being clamped in position by means of support members forming an acute angle in such a manner that, with a view to performing such operations, the carcass and portions thereof are externally freely accessible. In addition, the invention relates to an apparatus for carrying out said method.

DESCRIPTION OF THE PRIOR ART

Canadian Pat. No. 751.593 describes a method according to which a carcass of slaughtered poultry is clamped between two shaped clamping members between which the back portion of the carcass is advanced via the eviscerating opening in the rear part, whereupon the lower clamping member is mechanically driven in the direction of the upper member, thus firmly securing the carcass portion between the clamping members.

Furthermore this patent discloses a device comprising a vertical, box-shaped frame having a first clamping member horizontally protruding therefrom and, disposed thereunder, a likewise protruding second clamping member which is pivotally supported and which can be pushed towards the first clamping member by a suitable drive mechanism. The first clamping member is spoon-shaped and the second clamping member supporting the back and legs is cup-shaped.

Said known method is only suited to be used for carcasses or carcass portions in which the pelvis is still present and thus has not been removed in a previous treatment for removing parts of the carcass. Moreover, in this known method, the legs of the poultry are clamped as well, so that it is difficult, if not impossible, to remove the legs from a carcass clamped in this way.

This known device has the drawback that processing carcass portions with the pelvis removed is not possible, whereas removing the legs is actually possible, but not easily manageable. The device is furthermore complicated, due to the presence of the pivoting support and the necessary drive mechanism, and is in fact only suitable for stationary installation, while the necessary periodic cleaning operations are rendered difficult, due to the complicated shape of the parts.

In addition, there are known devices with cone-shaped carrier members upon which the carcasses are placed via the gutting opening in the rear part.

Such devices are simple per se, but there is no good fixation of the carcass in a particular position because the carcass can rotate about the cone—while in addition the abdomen is not accessible when it is necessary as a preparation for manual filleting to break away the sternum.

SUMMARY OF THE INVENTION

The object of the invention is to provide a method affording proper positioning and clamping of the carcass, and optimum internal and external accessibility thereof with a view to carrying out processing operation, in particular in a manner so that the carcass is preferably acted on only at those parts which can be considered to form a by-product of little value at the end of such operations. A further object of the invention is to provide a device which is simple and can be utilized both for stationary use and for mounting on a belt conveyer, and which can be used for manual as well as mechanical processing.

According to the invention, the support members are caused to act on the carcass portion located in the vicinity of the neck opening.

Thus, in the method according to the invention, the carcass or carcass portions are held at the parts of least value for consumption whereas most valuable parts are kept entirely free, thus enabling optimum processing and the highest possible cutting yield to be achieved.

In addition, the method of the invention is suitable for the processing of many different carcasses and/or carcass portions.

In order to support a complete carcass of, for instance, a chicken or of a "front half", one of the support members is brought into abutment against the backbone via the neck opening, the other support member being caused to support the back on the outer side.

In order to support the carcass or a carcass portion of a bird with a solid structure, such as e.g. a turkey, the two support members can be inserted via the neck opening and caused to clampingly enclose, through said neck opening, the backbone, the clavicles and the sternum.

A device, for carrying out the method according to the invention comprises support members having at least two supporting faces jointly forming an acute angle and adapted to act on carcass portions located in the vicinity of the neck opening.

Such a device can comprise a hollow external back-support member and an opposed elongated pin-shaped positioning member, said back-support member and positioning member forming an acute angle whose apex lies near the base of the positioning member, in a manner so that between the back-support member and the positioning member there is formed space for receiving the front carcass portion, the free end of the positioning member being located between the backbone and the sternum.

The face of the positioning member opposite the back-support face is preferably in the form of a cavity, while it is advantageous when there are two cavities adjacent to both sides of the base of the positioning member and provided for supporting the shoulders of the carcass.

The device can comprise a base and, projecting upwardly therefrom, a support member whose front face provided with a cavity constitutes the back-support member and from whose lower part there projects the positioning member.

Furthermore preferably perpendicular to the longitudinal plane of symmetry of the support member a bore is formed therein communicating with the cavities of the back-support member and the positioning member.

Another embodiment comprises an inserting pin carrying a V-shaped plate, provided with end edges diverging from the inserting end with respect to the rear end of the inserting pin.

The front end of the clamping plate can be connected to the inserting pin by way of a flat connecting part.

DESCRIPTION OF THE DRAWING

FIG. 5 is a front view of a carrier member with a carcass portion;

FIG. 6 is a front view of a carrier member with a "front-half" carcass portion;

FIG. 7 is a side view of this carrier member with a carcass portion;

FIG. 10 is a side view of a third embodiment;

FIG. 11 is a top view of this embodiment, and

FIG. 12 shows the use thereof.

DESCRIPTION OF A PREFERRED EMBODIMENT

Figure 1:
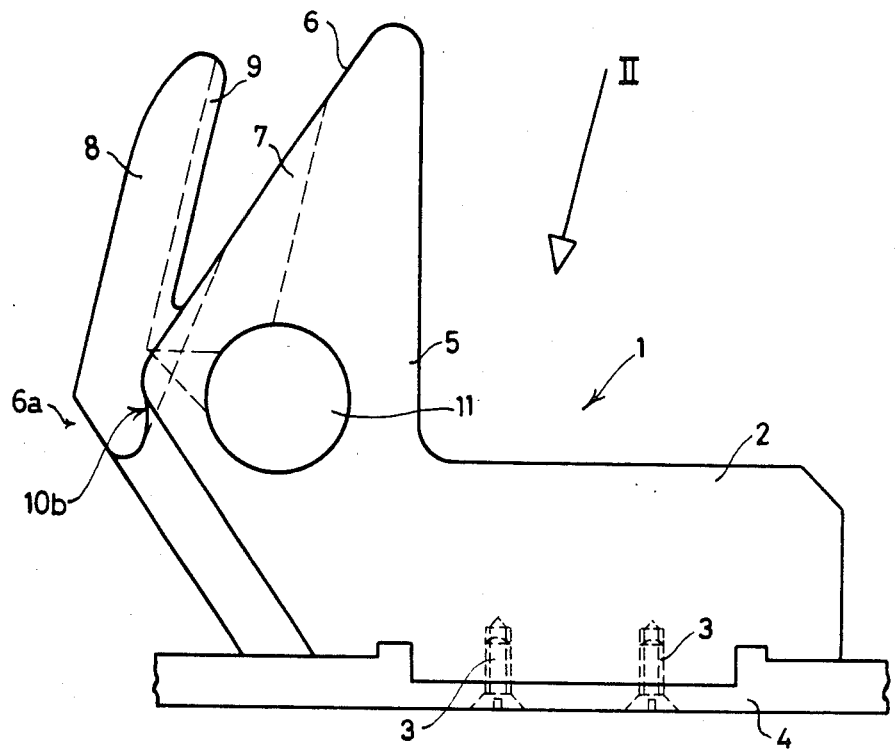
FIG. 1 is a side view of a first embodiment of the carrier member according to the invention.
Figure 2:
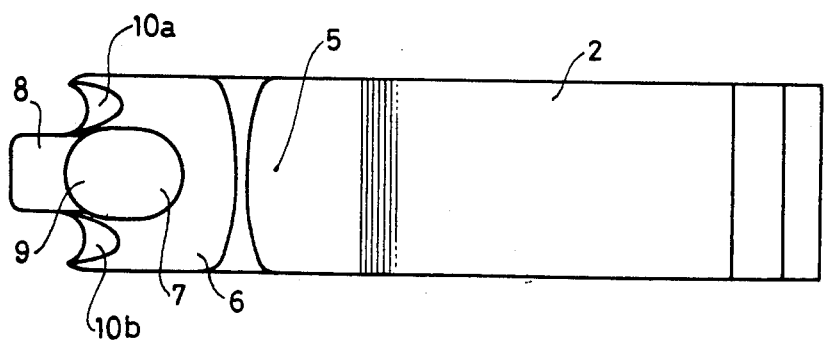
FIG. 2 is a view in the direction of the arrow II in FIG. 1.
Figure 3:
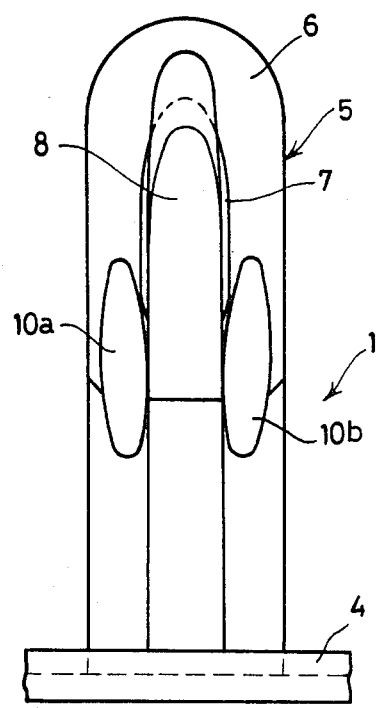
FIG. 3 is a front view of this embodiment.

The carrier member according to the invention as shown in the FIGS. 1–5, and generally indicated by the reference numeral 1, is made in one piece from a suitable material, e.g. plastics and comprises a base 2 which can be secured to a support 4 in any manner suitable, e.g. by means of screws 3. Said support may be e.g. an endless conveyer belt, which is ultimately supported by the floor and which carries the carcasses along various processing stations.

Projecting from the base 2 is the support member 5 on the front provided with a supporting face 6 having a cavity 7 formed therein. In the vicinity of the lower end 6a of the supporting face 6 protrudes a pin-shaped positioning member 8 which, on the narrow side directed towards the supporting face 6, is provided with a cavity 9. On both sides of the lower end of said pin-shaped positioning member 8, there are two elongated cavities 10a, 10b formed in said supported faces 6.

In addition, the support member 5 is provided with a channel 11 formed therein whose longitudinal axis is perpendicular to the plane of symmetry of the carrier member and wherein the cavity 7 ends. Said bore 11 provides a free passage for the neck, prevents accumulation of ingredients from the neck (skin parts, membranes) and is also adapted for discharging the cleaning water, used to clean the carrier member.

Figure 4:
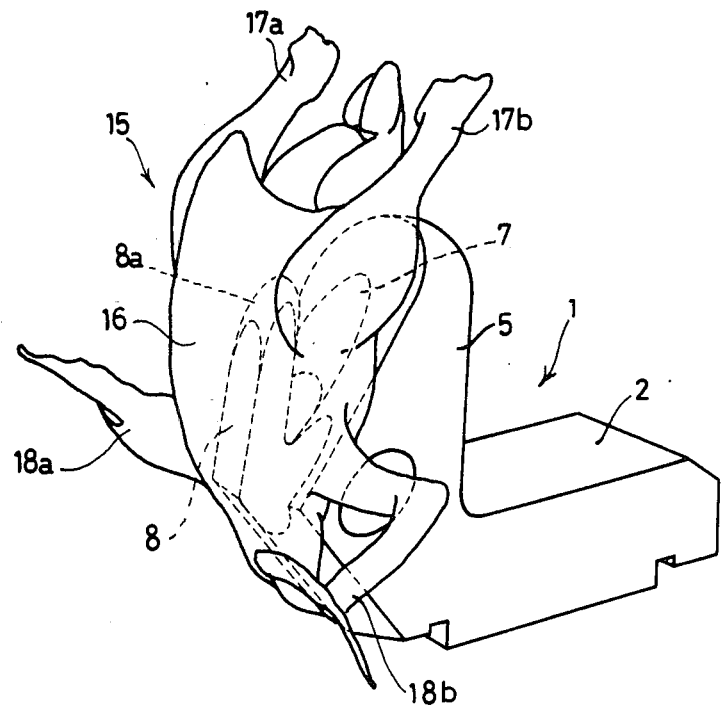
FIG. 4 is a perspective view and shows the carcass as secured in position on the carrier member according to the invention.

FIG. 4 shows the manner in which a carcass 15 consisting of a body part 16, legs 17a, 17b and wings 18a, 18b is firmly secured in position on the carrier member 1. The carcass back fits into the cavity 7; the neck—not shown in the Figure—fits into the lower part of the cavity between the supporting face and the positioning pin 8 whose free end 8a lies in the carcass cavity. The neck can then penetrate into the bore 11. Thus, the carcass is perfectly secured into position by means of its back, shoulders and neck stump in such a manner that, as practice has shown greater forces too can be exerted thereon in operations which are performed by hand or machine.

FIG. 5 shows a front view of a carrier member 1 with a carcass 15: all important parts of the carcass which are to be removed prove to be perfectly accessible. The legs 17a, 17b can be removed by means of a cut performed according to the dash lines 19a, 19b; the wings 18a, 18b can be removed by a cut performed according to the dash lines 20a, 20b. So it is clear, that all portions of importance are perfectly available.

FIG. 6 shows a front view of a "front-half" 25 positioned on the carrier member 1; FIG. 7 shows a side view thereof. A front half is a carcass portion the legs and a portion of the back of which have been already removed in a previous operation. The wings 26a, 26b and the breast or the breast fillet can be removed from such front half in the same manner as used for whole carcasses according to a method frequently used in separating operations on an overhead conveyer. In this case too, what has been stated with respect to the whole carcass in the foregoing, applies to the accessibility of the breast and wings.

Figure 8:
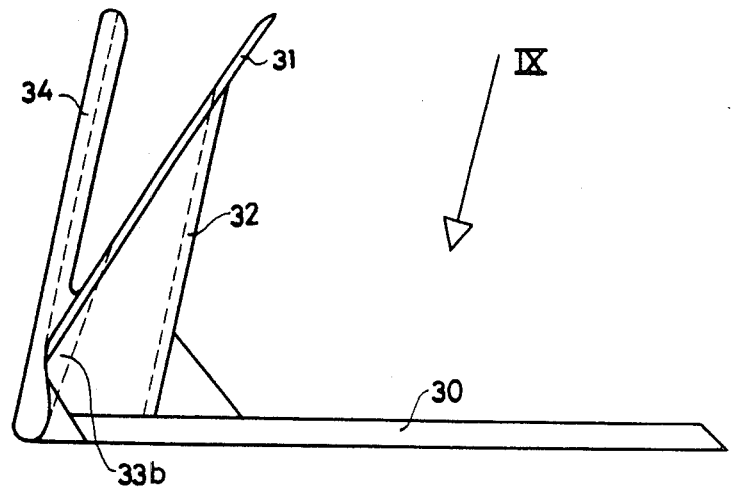
FIG. 8 is a side view of a second embodiment according to the invention.
Figure 9:
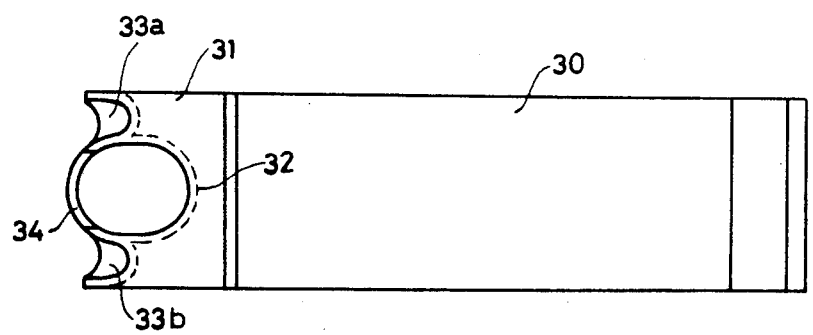
FIG. 9 is a view in the direction of the arrow IX in FIG. 8.

The FIGS. 8, 9 relate to an embodiment in which the back-support member and the pin-shaped positioning member are made of a metal, for example stainless steel. The back-support member 31 with its central cavity and continuous hollow parts 33a, 33b is fixed to the support plate 30, for instance by welding; the pin-shaped positioning member 34, whose cavity faces the back-support member 32, is attached to said support plate.

The FIGS. 10, 11 and 12 show an embodiment of the carrier member according to the invention particularly adapted to be used in poultry with a strong carcass whose carcass portions are solidly joined in the area of the neck by connective and muscular tissue, such as turkeys.

Herein, the support members are formed with a pin 40 and V-shaped fixing plate 50 attached to the pin by means of a flat connecting part 51 and a short connecting ridge 52. By means of an intermediate part 42, both support members are additionally joined to a holding pin 43 contained in a receiving block 47. The receiving block may be mounted on a stationary arrangement or on a conveyer belt.

The inserting pin has a conical end 41 and the holding pin 43 is provided with a stop ring 44 and a locking groove 46, the latter cooperating with a locking pin 48, so that the carrier member can be removed from the block 47 and be set in different positions as desired.

As seen in FIG. 11 in particular, the upright end edges 54a and 54b diverge outwardly towards the rear end 53 of the inserting pin 40; FIG. 12 shows the manner in which the carrier member is used. The carrier member 40 with the clamping plate 50 is inserted into the carcass 56 through the neck opening; the clamping plate and carrier member are then clampingly enclosed by the neck opening 57, the sternum 58, the backbone 59, the clavicle 60 and the ribs 61. The extremity 41 then supports the carcass 56 near the end of the back.

What is claimed is:

1. A device for supporting a carcass or carcass portion of slaughtered poultry for the purpose of performing operations thereon, comprising fixed support members having at least two supporting faces jointly forming an acute angle, with one supporting face adapted to act on internal carcass portions located in the vicinity of the neck opening and the second supporting face adapted to act on external carcass portions, said fixed support members cooperating together to prevent rotation of said carcass or carcass portion during operations thereon.

2. A device according to claim 1, comprising a hollow external back-support member and an opposed elongated pin-shaped positioning member, said back-support member and positioning member forming an acute angle whose apex lies near the base of the positioning member, in a manner so that between the back-support member and the positioning member there is formed space for receiving the front carcass portion, the free end of the positioning member being located between the backbone and the sternum.

3. A device according to claim 2, in which the face of the positioning member opposite the back-support face is in the form of a cavity.

4. A device according to claim 2, comprising two cavities adjacent to both sides of the base of the positioning member and provided for supporting the shoulders of the carcass.

5. A device according to claims 2, comprising a base and, projecting upwardly therefrom, a support member whose front face provided with a cavity constitutes the back-support member and from whose lower part there projects the positioning member.

6. A device according to claim 5, in which perpendicular to the longitudinal plane of symmetry of the support member a bore is formed therein communicating with the cavities of the back-support member and the positioning member.

7. A device for supporting a carcass portion of slaughtered poultry for the purpose of performing operations thereon comprising an inserting pin carrying a V-shaped clamping plate provided with end edges diverging from the inserting end with respect to the rear end of the inserting pin, said inserting pin and clamping plate being joined to a holding pin contained in a receiving block.

8. A device according to claim 7, in which the front end of the clamping plate is connected to the inserting pin by way of a flat connecting part, and the base of the clamping plate is connected to the inserting pin by way of a conecting ridge.

9. A method for supporting a carcass or carcass portion of slaughtered poultry in such a manner that the carcass and carcass portions thereof are freely accessible externally for the purpose of performing operations thereon comprising clamping said carcass or carcass portion into position by means of fixed support members forming an acute angle, in which one of the support members is inserted through the neck opening and brough into abutment internally against the carcass, and the other support member supports the back externally on the other side, said fixed support members cooperating together to prevent rotation of said carcass or carcass portion during operations thereon.

10. A method for supporting a carcass or carcass portion of slaughtered poultry in such a manner that the carcass and carcass portions thereof are freely accessible externally for the purpose of performing operations thereon comprising clamping said carcass or carcass portion into position by inserting a carrier member and a fixed clamping plate through the neck opening such that said carrier member and said fixed clamping plate are brought into contact internally with the sternum, the backbone, the clavicle, and the ribs.

* * * * *